United States Patent
Byrnes et al.

(10) Patent No.: US 11,694,061 B2
(45) Date of Patent: Jul. 4, 2023

(54) NEURAL-SYMBOLIC COMPUTING

(71) Applicant: SRI International, Menlo Park, CA (US)

(72) Inventors: John Byrnes, Poway, CA (US); Richard Rohwer, San Diego, CA (US); Andrew Silberfarb, San Diego, CA (US)

(73) Assignee: SRI International, Menlo Park, CA (US)

( * ) Notice: Subject to any disclaimer, the term of this patent is extended or adjusted under 35 U.S.C. 154(b) by 259 days.

(21) Appl. No.: 17/283,502

(22) PCT Filed: Mar. 15, 2021

(86) PCT No.: PCT/US2021/022401
§ 371 (c)(1),
(2) Date: Apr. 7, 2021

(87) PCT Pub. No.: WO2021/184013
PCT Pub. Date: Sep. 16, 2021

(65) Prior Publication Data
US 2023/0122497 A1    Apr. 20, 2023

Related U.S. Application Data

(60) Provisional application No. 62/987,687, filed on Mar. 10, 2020.

(51) Int. Cl.
*G06N 3/04*    (2023.01)
*G06N 3/042*    (2023.01)
*G06N 3/084*    (2023.01)

(52) U.S. Cl.
CPC ............ *G06N 3/042* (2023.01); *G06N 3/084* (2013.01)

(58) Field of Classification Search
None
See application file for complete search history.

(56) References Cited

U.S. PATENT DOCUMENTS

| 7,689,526 B2 | 3/2010 | Byrnes et al. |
| 8,788,701 B1 | 7/2014 | Byrnes et al. |
| 2005/0194993 A1 | 9/2005 | Lablans |
| 2007/0239632 A1 | 10/2007 | Burges et al. |
| 2012/0158685 A1 | 6/2012 | White et al. |

(Continued)

FOREIGN PATENT DOCUMENTS

WO    2018208813 A1    11/2018

OTHER PUBLICATIONS

International Search Report and Written Opinion, PCT/US2018/031645, ISA:US, dated Aug. 7, 2018, 14 pages.

(Continued)

*Primary Examiner* — Lut Wong
(74) *Attorney, Agent, or Firm* — Rutan and Tucker, LLP

(57) ABSTRACT

A neural-symbolic computing engine can have two or more modules that are configured to cooperate with each other in order to create one or more gradient-based machine learning models that use machine learning on i) knowledge representations and ii) reasoning to solve an issue. A model representation module in the neural-symbolic computing engine is configured to apply one or more mathematical functions, at least including a logit transform, to truth values from first order logic elements supplied from a language module of the neural-symbolic computing engine.

20 Claims, 7 Drawing Sheets

(56) References Cited

U.S. PATENT DOCUMENTS

| | | |
|---|---|---|
| 2014/0201126 A1 | 7/2014 | Zadeh et al. |
| 2015/0286969 A1 | 10/2015 | Warner et al. |
| 2016/0179945 A1 | 6/2016 | Lastra Diaz et al. |
| 2017/0039486 A1 | 2/2017 | Simard et al. |
| 2018/0349767 A1 | 12/2018 | Xiao et al. |
| 2020/0073788 A1 | 3/2020 | Saha et al. |
| 2020/0193286 A1 | 6/2020 | Byrnes et al. |
| 2020/0218971 A1 | 7/2020 | Ustinova et al. |

OTHER PUBLICATIONS

C. M. Bishop. Pattern Recognition and Machine Learning. 2006, 758 pages, Springer, New York.
Buchanan, B. et al. Denral and Meta-Dendral: Their Applications Dimension. Artificial Intelligence, 1978, 20 pages.
Byrnes, J. et al. Text Modeling for Real-Time Document Categorization. IEEE Aerospace Conference, 2005, 11 pages, Big Sky.
Fabre, C. et al. Distributional Semantics Today Introduction to the Special Issue. Traitement Automatique des Langues (Hermes Science Publications), 2015, 15 pages, Semantique distributionnelle.
Freitag, D. et al. New Experiments in Distributional Representations of Synonymy. Ninth Conference on Computational Natural Language Learning (CoNLL), 2005, 8 pages, Ann Arbor.
Graves, A. et al. Neural Turing Machines, arxiv.org/abs/1410.5401, 2014, 26 pages.
Graves, A. et al. Hybrid Computing Using A Neural Network With Dynamic External Memory. Nature, 2016, 21 pages.
Kanerva, P. The Spatter Code for Encoding Concepts at Many Levels. ICANN94, 1994, 4 pages.
Kanerva, P. Hyperdimensional Computing: An introduction to Computing in Distributed Representation with High-Dimensional Random Vectors. Cognitive Computation 1, 2009, 21 pages.
Paradis, R. et al. Finding Semantic Equivalence of Text Using Random Index Vectors, Proceedings of the Complex Adaptive Systems, 2013, 6 pages.
Kanerva, P. What We Mean When We Say "What's the Dollar of Mexico?": Prototypes and Mapping in Concept Space. Quantum Informatics for Cognitive, Social, and Semantic Processes, AAAI Fall Symposium, Arlington, Virginia, 2010, 5 pages.
Krizhevsky, A. et al. ImageNet Classification with Deep Convolutional Neural Networks. Advances in Neural Information Processing Systems, 2012, 9 pages.
Landauer, T. K. et al. A Solution to Plato's Problem: The Latent Semantic Analysis Theory of Acquisition, Induction, and Representation of Knowledge, Psychological Review, 1997, 30 pages.
Lou, C. et al. Ribozyme-based insulator parts buffer synthetic circuits from genetic context. Nature Biotechnology, 2012, 13 pages.
Mikolov, T. et al. Linguistic Regularities in Continuous Space Word Representations. NAACL-HLT 2013, 2013, 6 pages.
Molyneux, S. Meta + The Chan Zuckerberg Initiative: Unlocking Scientific Knowledge, https://www.facebook.com/notes/sam-molyneux/meta-the-chan-zuckerberg-initiativeunlocking-scientific-knowledge/1429809013718811. Retrieved Feb. 3, 2017, 4 pages.
NECPC and SRI International Jointly Develop Artificial Intelligence for Machine Learning of Web Content. http://nec-lavie.jp/common/release/en/1701/2601.html. Retrieved Feb. 3, 2017, 3 pages.
Plate, T. A common framework for distributed representation schemes for compositional structure. Connectionist Systems for Knowledge Representation and Deduction, 1997, 20 pages.
Plate, T. Estimating analogical similarity by dot-products of Holographic Reduced Representations. NIPS, 1993, 8 pages.
Pollack, J. B. Recursive Distributed Representations. Artificial Intelligence, 1990, 32 pages.
Richardson, M. et al. Markov Logic Networks. Machine Learning, 2006, 44 pages.
Rohwer, R. A representation of representation applied to a discussion of variable binding. Neurodynamics and Psychology, 1994, 10 pages.
Rohwer, R. et al. Coarse Lexical Translation with no use of Prior Language Knowledge. Proc. Workshop on Building and Using Comparable Corpora, Language Resources and Evaluation Conference (LREC), 2008, 6 pages, Marrakech, Morocco.
Rohwer, R. The 'Moving Targets' Training Algorithm. Advances in Neural Information Processing Systems 2, 1990, 8 pages.
Rumelhart, D. E. et al. Parallel Distributed Processing: Explorations in the Microstructure of Cognition. MIT Press, 1986, 544 pages.
Schmidhuber, J. Deep Learning in Neural Networks: An Overview. Tech Report IDSIA 03014, arXiv:1404.7828 v4, 2014, 75 pages.
Shaohuai, S. et al. Benchmarking State-of-the-Art Deep Learning Software Tools. arXiv:1608.07249v6, 2017, 6 pages.
Socher, S. et al. Parsing Natural Scenes and Natural Language with Recursive Neural Networks. Proceedings of the 28th International conference on Machine Learning, 2011, 8 pages.
Weiss, W. et al. Fundamentals of Model Theory, University of Toronto, 2015, 64 pages.
First-order Logic. Wikipedia, The Free Encyclopedia, https://en.wikipedia.org/w/index.php?title=First-order_logic&oldid=763770663. Accessed Feb. 5, 2017. 26 pages.
Xiong, C. et al. Dynamic Memory Networks for Visual and Textual Question Answering. arXiv:1603.01417v1, 2016, 10 pages.
Zhu, H. et al. Bayesian Invariant Measurements of Generalisation, Neural Processing Letters, 1995, 5 pages.
Zhu, H. et al. Bayesian Regression Filters and the Issue of Priors. J. Neural Computing and Applications, 1996, 20 pages.
Zhu, H. et al. Measurements of Generalisation Based on Information Geometry. Mathematics of Neural Networks: Models, Algorithms, and Applications, 1997, 7 pages.
Zhu, H. et al. No Free Lunch for Cross Validation. Neural Computation, 1996, 4 pages.
Li, Qing et al. Closed Loop Neural-Symbolic Learning via integrating Neural Perception, Grammar Parsing, and Symbolic Reasoning, Proceedings of the 37th International Conference on Machine Learning, Online, Jul. 2020, 11 pages.
Bengio, Y. Practical Recommendations for Gradient-Based Training of Deep Architectures. Sep. 16, 2012, 33 pages.
Garcez, A. et al. Neurosymbolic AI: The 3rd Wave. Dec. 2020, 37 pages, Federal University of Rio Grande do Sul, Brazil.
Sikka, K. Deep Adaptive Semantic Logic (DASL): Compiling Declarative Knowledge into Deep Neural Networks. Mar. 16, 2020, 12 pages.
Extended European Search Report for Application No. 18798256.6, European Patent Office, dated Dec. 23, 2020, 6 pages.
Soumali Roychowdhury et al., "Regularizing deep networks with prior knowledge: A constraint-based approach." Knowledge-Based Systems, Apr. 2, 2022, 10pages, Elsevier B.V.
Karan Sikka et al., "Deep Adaptive Semantic Logic (DASL): Compiling Declarative Knowledge into Deep Neural Networks." ArXiv, Mar. 16, 2020, 12 pages, Cornell University Library, USA.
Andrei Popescu et al., "An overview of machine learning techniques in constraint solving." Journal of Intelligent Information Systems, Aug. 30, 2021, 28 pages, Springer.
Besold et al., "Reasoning in non-probabilistic uncertainty: Logic programming and neural-symbolic computing as examples." Minds and Machines 27.1 (2017): 37-77, ArXiv, Mar. 1, 2017, 44 pages, Cornell University Library, USA.
Garcez et al. "Neural-symbolic learning and reasoning: contributions and challenges." May 15, 2015, 6 pages, City Research Online, University of London, USA.
International Search Report PCT/US2021/022401, dated May 27, 2021, 2 pages.

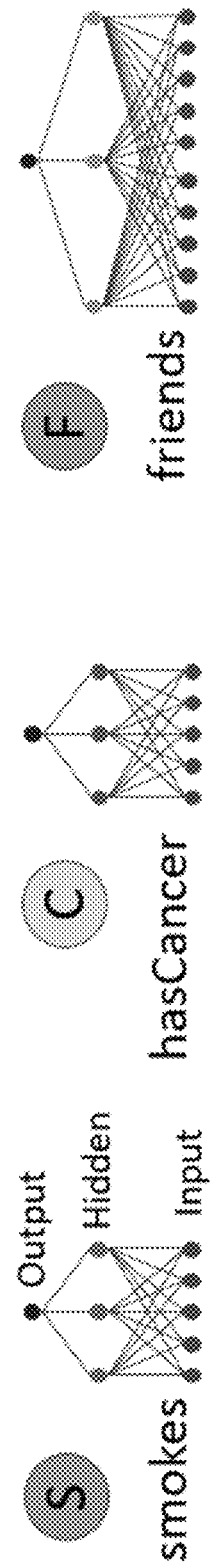
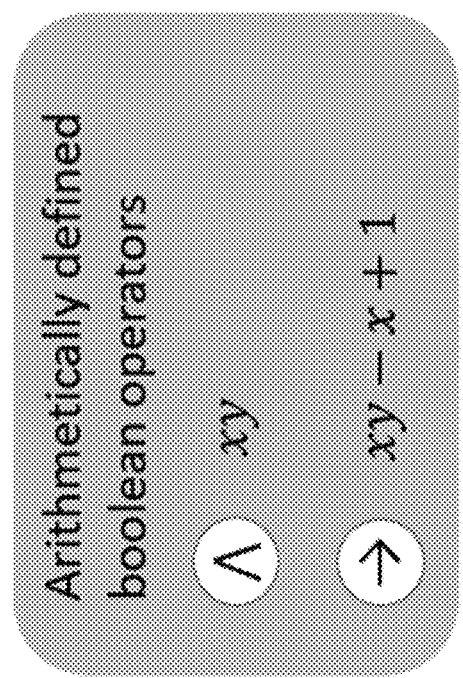
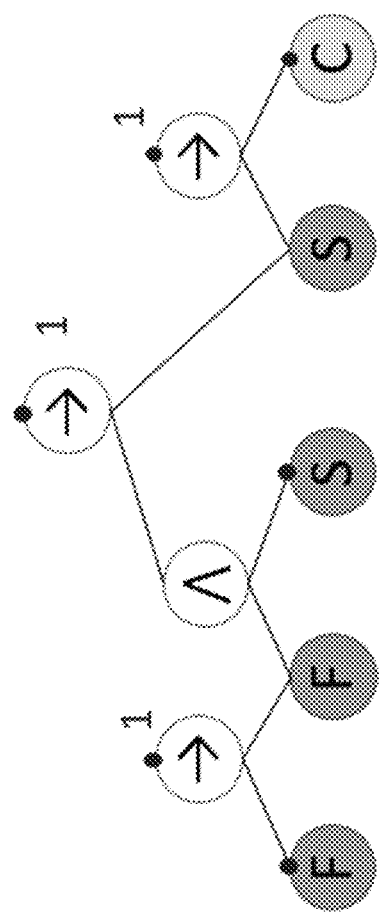
Figure 3

NEURAL-SYMBOLIC COMPUTING

CROSS-REFERENCE

This application is a 35 U.S.C. § 371 U.S. National Stage of International Patent Application No. PCT/US2021/022401, titled "Numeric architecture for neural-symbolic computing," having an International Filing Date of Mar. 15, 2021, which the disclosure of such is incorporated herein by reference in its entirety.

TECHNICAL FIELD

An embodiment of a concept herein relates to techniques and tools in neural-symbolic computing.

BACKGROUND

Deep neural networks, by themselves, can lack strong generalization, e.g. ability to discover new regularities, irregularities, etc. and then extrapolate beyond training sets. Deep neural networks interpolate and approximate on what is already known, which is why inherently they cannot truly be creative and make new discoveries in the sense that humans can, though they can produce creative-looking works that vary on the data they have ingested. Neural networks normally can also have a very long training time to train all of the sub problems individually incorporated into accomplishing a task and then combining all of the sub problems to be solved as a whole.

Machine learning has additional problems. For example, gradients with a large number of inputs are a problem where large error gradients accumulate and lead to inaccuracies in neural network model weights during training. The problem occurs through growth by repeatedly multiplying truth values through the network layers making up a structure in a neural network essentially removing all gradient information at the limits toward zero ('0') so that there is very little gradient for learning. This has the effect of the resultant model being unstable and unable to learn from the training data.

Also, knowledge representations, both in classical AI and in neural-symbolic computing, often restrict the language of first order logic (e.g. fixed rules) in order to reduce computational complexity.

SUMMARY

Provided herein are various methods, apparatuses, and systems for an artificial intelligence based reasoning engine and explaining its reasoning process.

A neural-symbolic computing engine has two or more modules that cooperate with each other in order to create one or more gradient-based machine learning models that use machine learning on i) knowledge representations and ii) reasoning to solve an issue. A model representation module in the neural-symbolic computing engine can apply one or more mathematical functions, at least including a logit transform, to truth values from first order logic elements supplied from a language module of the neural-symbolic computing engine.

These and many more embodiments are discussed.

DRAWINGS

FIG. 3 illustrates an embodiment of a block diagram of example constants and functions and predicates associated with network parameters to be encoded by a theory module and implemented in gradient-based machine learning model that undergoes gradient-based learning;

Figure 4:
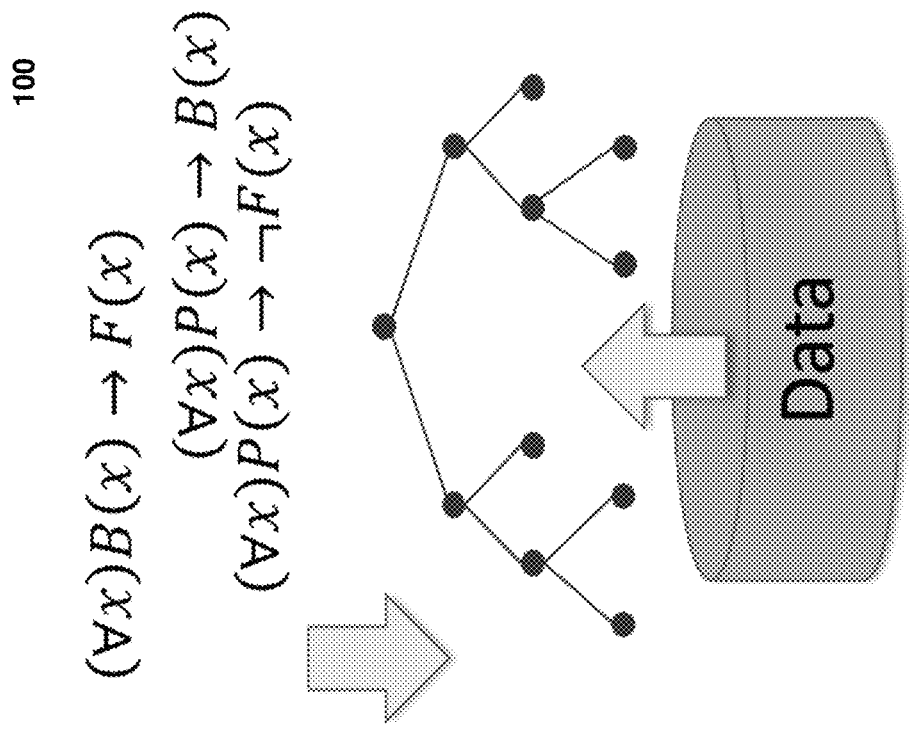
Figure 5:
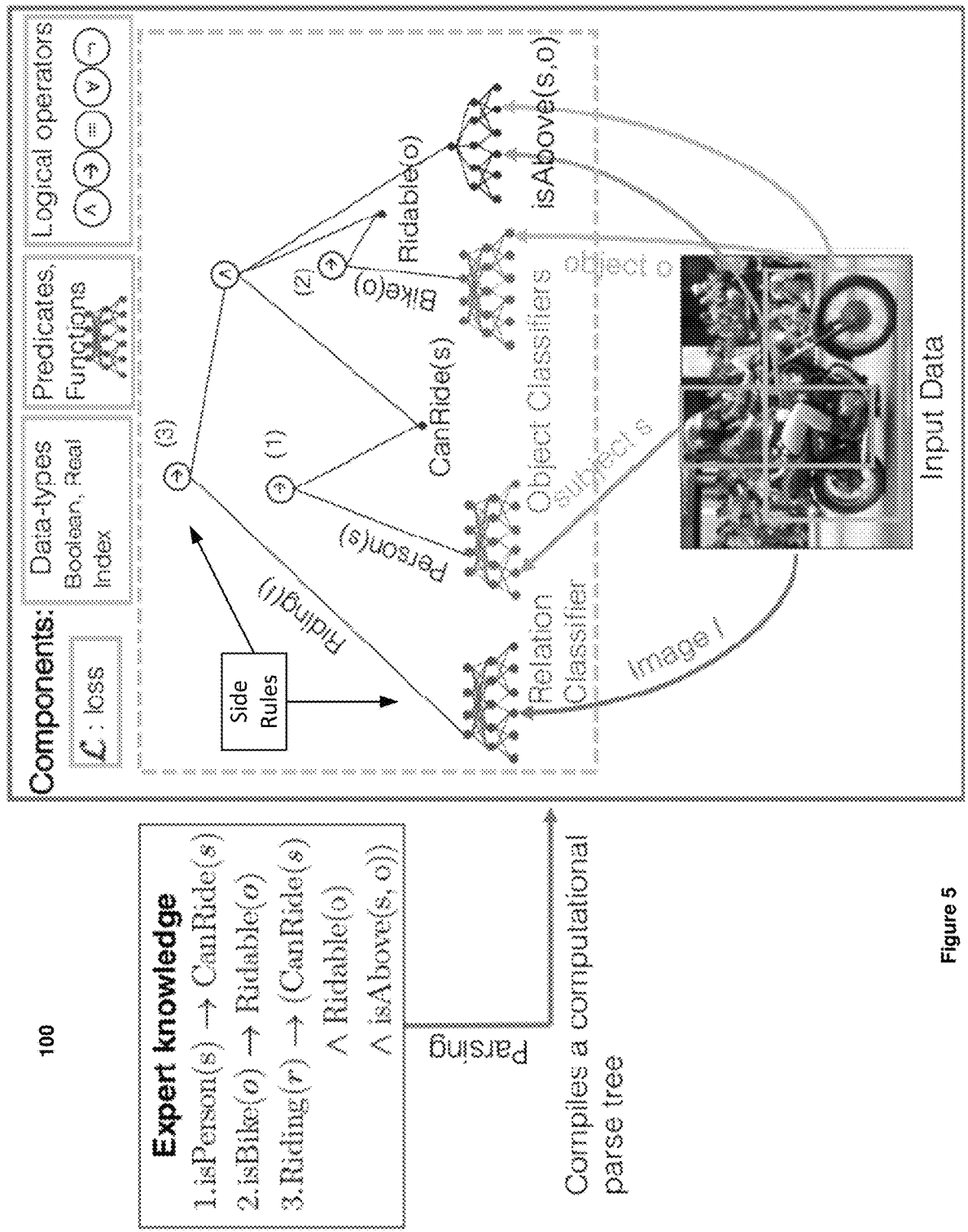
Figure 6:
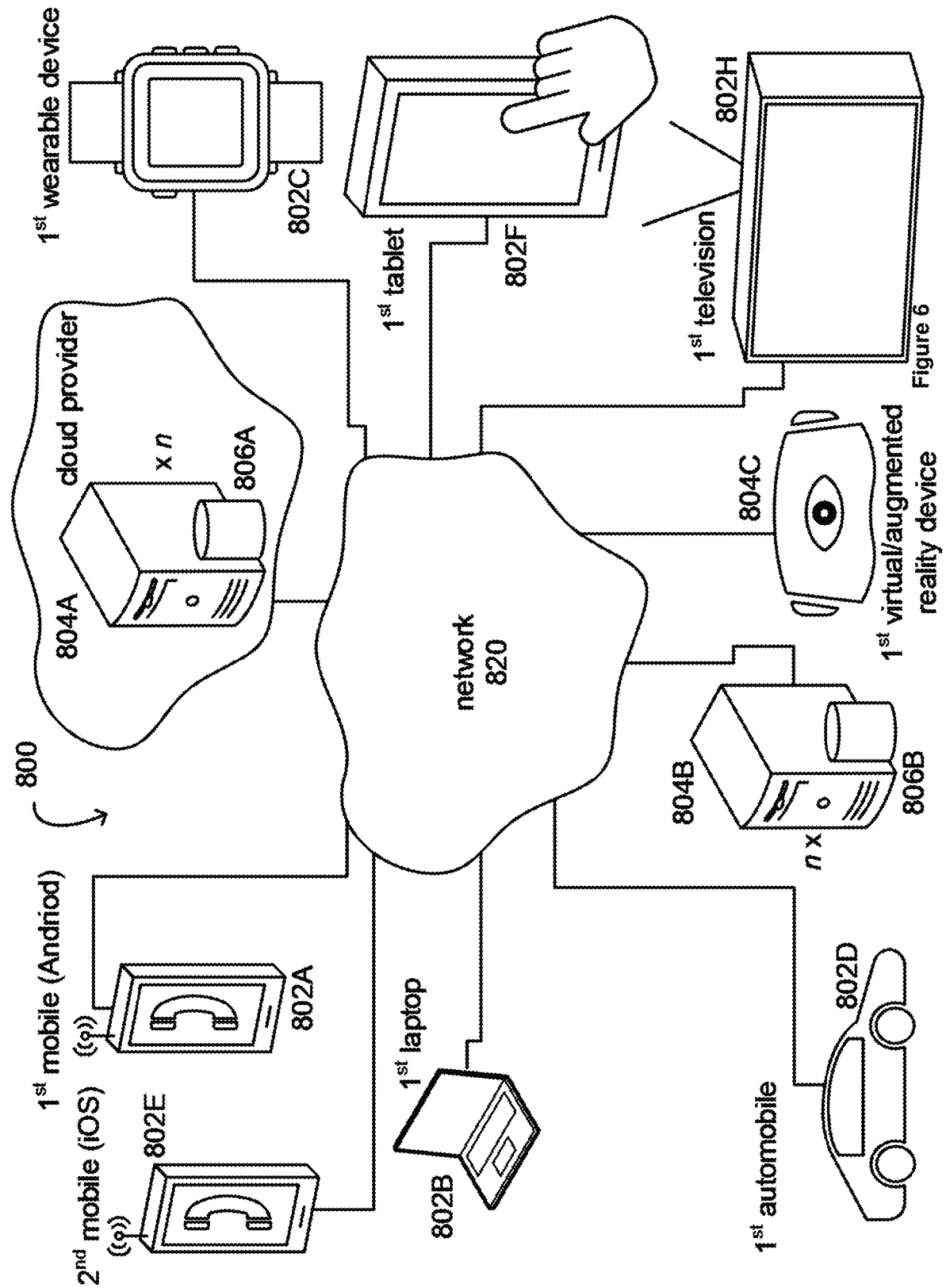
Figure 7:
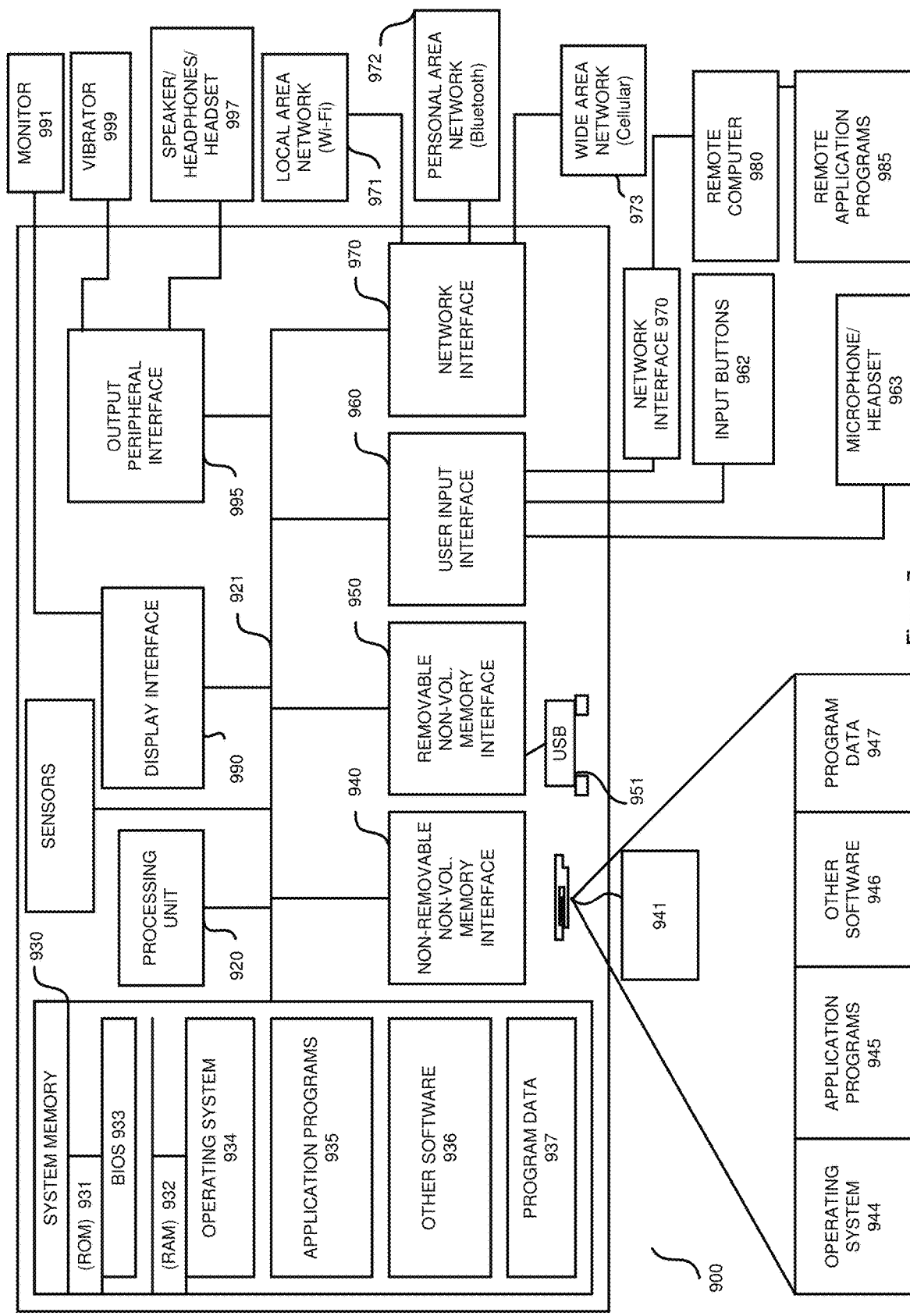

FIG. 4 graphically illustrates a diagram of an embodiment of the concept of a deep adaptive semantic logic network being trained with both i) the knowledge assertions in the representations and reasoning provided from the expert knowledge through a theory module and ii) machine learning assertions derived from iterative training on data. Sets of statements create a set of rules to create the structure of the machine learning model and initially test the representations and reasons;

FIG. 5 illustrates a block diagram of an embodiment of an example neural-symbolic computing engine that has a side-rules component configured to function as a flexible gate to mask specified information in specified situations with respect to the fixed rules to influence learning in a gradient-based machine learning model;

FIG. 6 illustrates a diagram of a number of electronic systems and devices communicating with each other in a network environment in accordance with an embodiment of the neural-symbolic computing engine; and FIG. 7 illustrates a diagram of an embodiment of one or more computing devices that can be a part of the systems associated with the explanation engine cooperating with the neural-symbolic computing engine discussed herein.

While the design is subject to various modifications, equivalents, and alternative forms, specific embodiments thereof have been shown by way of example in the drawings and will now be described in detail. It should be understood that the design is not limited to the particular embodiments disclosed, but—on the contrary—the intention is to cover all modifications, equivalents, and alternative forms using the specific embodiments.

DESCRIPTION

In the following description, numerous specific details can be set forth, such as examples of specific data signals, named components, number of models, etc., in order to provide a thorough understanding of the present design. It will be apparent, however, to one of ordinary skill in the art that the present design can be practiced without these specific details. In other instances, well known components or methods have not been described in detail but rather in a block diagram in order to avoid unnecessarily obscuring the present design. Further, specific numeric references such as the first server, can be made. However, the specific numeric reference should not be interpreted as a literal sequential order but rather interpreted that the first server is different than a second server. Thus, the specific details set forth can be merely exemplary. The specific details can be varied from and still be contemplated to be within the spirit and scope of the present design. The term "coupled" is defined as meaning connected either directly to the component or indirectly to the component through another component.

Figure 1:
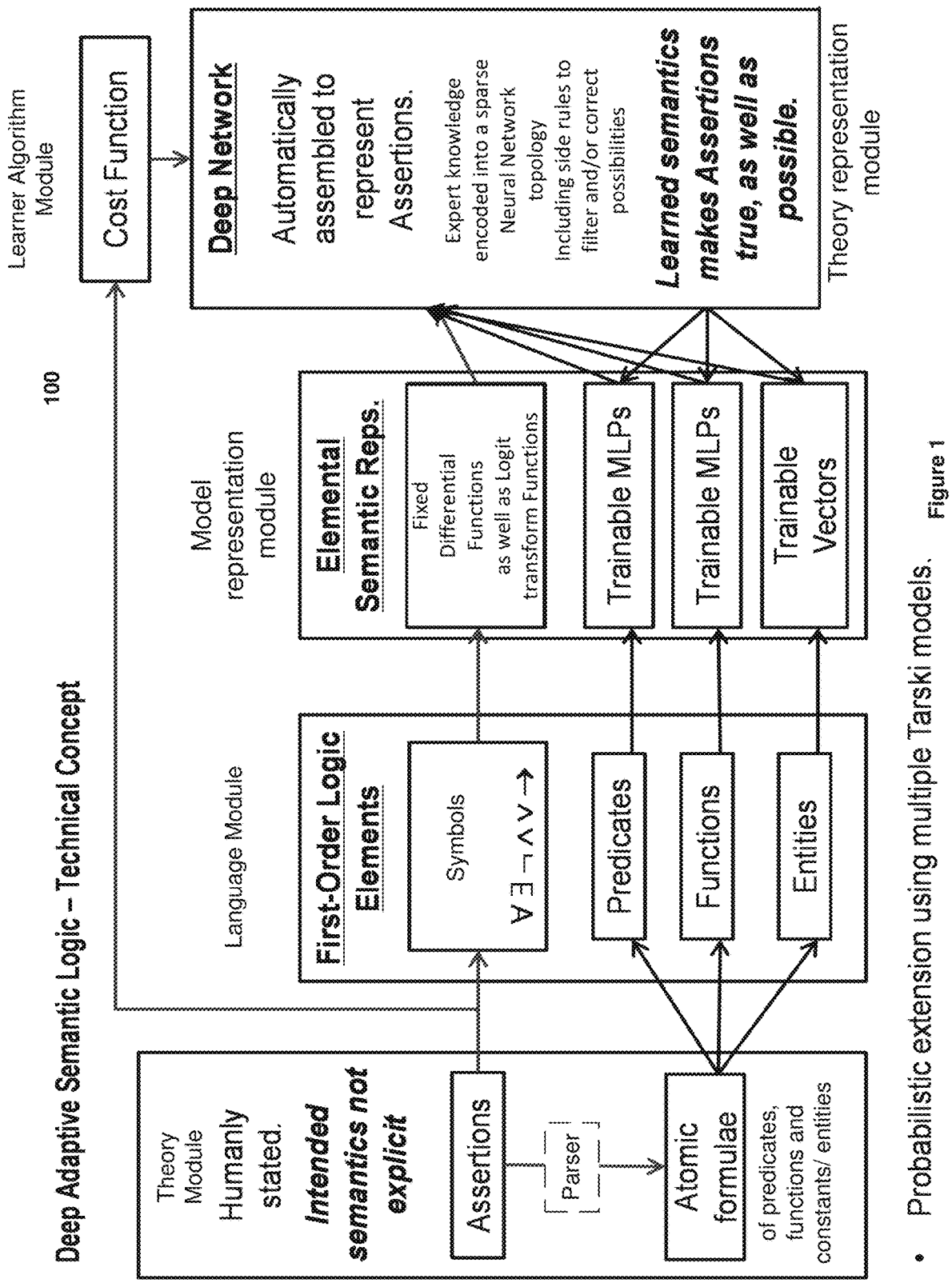
FIG. 1 illustrates a block diagram of an embodiment of an example neural-symbolic computing engine that has two or more modules that are configured to cooperate with each other in order to create one or more gradient-based machine learning models that use machine learning on i) knowledge representations and ii) reasoning to solve an issue.

FIG. 1 illustrates a block diagram of an embodiment of an example neural-symbolic computing engine (such as Deep Adaptive Semantic Logic (DASL)) that has two or more modules that are configured to cooperate with each other in order to create one or more gradient-based machine learning models, such as neural networks, that use machine learning, such as an adaptive semantic learning, on i) knowledge representations and ii) reasoning to solve an issue (e.g. task, problem, or other issue). The example neural-symbolic computing engine 100 can contain the following example modules a theory module, a language module, a model representation module, a theory representation module, and a learner algorithm module. The neural-symbolic computing engine 100 combines symbolic reasoning with neural network techniques to overcome limitations that each technique has when used by itself.

The neural-symbolic computing engine 100 has two or more modules that cooperate with each other to cause an encoding of the knowledge representations and the reasoning from the theory module into the gradient-based machine learning models complied in the theory representation module from information, such as a logical specification, supplied to the theory module of the neural-symbolic computing engine 100 by a person, such as an expert.

The theory module has an input for a user to supply a specification as well as other problem specific input on an issue to be solve by the machine learning and reasoning. The theory module can also cooperate with and reference domain specific databases of i) known terminology specific to the domain pertinent to the problem and ii) known rules and relationships within that domain pertinent to the problem. Thus, the theory module allows input of the humanly stated knowledge representations and reasoning, from one or more sources including an expert knowledge database and/or direct user input of discrete terms of art. The representations and reasoning are introduced to label qualitative and quantitative elements of structures to provide a vocabulary that enables scientists to describe and understand the system.

The theory module cooperates with the other modules to integrate this user-provided expert knowledge with training data for an example neural network being created to learn how to solve the problem/issue. The theory module is configured to encode and send assertions and atomic formulae of predicates, functions, and constants/entities to a language module via a parser module.

The language module uses first order logic elements to make formal scientific language comprehensible to computational algorithms by cooperating with the other modules to use machine learning to discover distributed vector representations of a meaning associated with the terminology. The first order logic elements used by the language module may include logical constants, predicates, functions, and entities such that rules are expressible in first order logic, for example, in any of these three: i) ontologies or knowledge bases; ii) OWL, KIF, SWRL, and iii) structured knowledge that can be formalized (e.g. flowcharts). The language module is also configured to contain an inventory of all of the symbols, constants, functions, and predicates derived from the statements of the expert and parsed out by the parser module.

The model representation module in the neural-symbolic computing architecture (e.g. artificial intelligence engine) can apply mathematical functions (including a logit transform, fixed differential functions, arithmetic operations, etc.) to truth values from first order logic elements, such as predicates, symbols, functions, and entities, supplied from the language module of the neural-symbolic computing engine 100. The model representation module can take in all of the symbols in the statements from the language module and then associate each of them with their own sub graph/network structure of a gradient-based machine learning model. The model representation module is also configured to take in all of the constants in the statements and map them to semantic vectors as inputs to the sub graph of the gradient-based machine learning model. The model representation module is also configured to take in all of the predicates in the supplied statements and then map them to a sub graph of the neural networks. (see, for example, FIG. 3)

The model representation module can incorporate logical symbols from the language module in a formula, such as $\Lambda$ and $\rightarrow$, which respectively can refer to 'and' as well as 'implies'.

The neural-symbolic computing engine 100 can represent the knowledge representations and reasoning in first order logic in the language module. The relations and functions that make up a vocabulary of the knowledge representations and reasoning are then implemented in the one or more neural networks that can have an arbitrary network structure, such as a machine reasoning tree. The logical connectives in the knowledge representations and reasoning are composed into, optionally, a single deep network with multiple intermediate levels from a bottom of the network structure to a top level of the network structure, which is trained to maximize a truthfulness measure of the knowledge representations and reasoning.

Thus, the model representation module can create a gradient-based machine learning model that uses the logit transform of the truth values to avoid vanishing gradients that would have resulted from multiplying truth values of a network in the gradient-based machine learning model. The truth values range from "0" thru to "1" and come from a deep network structure in the network having multiple intermediate levels from a bottom of the network structure to a top level of the network structure. To generate differentiable functions to support backpropagation, the approach herein replaces pure Boolean values of "0" and "1" for True and False with continuous values from "0" thru to "1".

The model representation module can have many different mathematical functions that can be applied to truth values in a network in the resultant gradient-based machine learning model. Under the state of the art, truth measurements would be multiplied to compute the truth measurement of a conjunction. Given 5 truth values of 0.01, their product is $t=(0.01)^5=10^{-10}$. 1−t is represented as exactly 1 in standard 4-byte arithmetic. If the truth values were all increased to 0.02, their product would be $t=(0.02)^5=32*10^{-10}$, but 1−t is also represented as exactly 1. Thus if 1−t is part of a loss function for training, the increase in truth values will not be detectable. This is the problem of "vanishing gradients". In an embodiment of the invention, the logit transform on the truth values represents the truth measurement 0.01 as log (0.01/0.99)=−4.6. The conjunction of 5 values is (approximately) their sum, which is −23.0. If the truth measurements increase to 0.02 then the logit representation is log(0.02/0.98)=−3.9, so 5 of them sum to −19.5. These numbers do not lead to rounding errors when added to 1.0, so the gradient is easily detectable and learning can occur. This makes it possible for the generated gradient-based machine learning model to consider more (a greater amount of) conjunctions of features/factors while learning and solving a problem as a whole; rather than having to break down parts of that issue being solved into smaller sub problems each with a small set of conjunctions of features and having to learn and train solve each one of those sub problems individually and then subsequently having to train to use the sub problems' combined outputs to solve the issue as the whole. Accordingly, the model representation module in the neural-symbolic computing engine 100 can apply the logit transform to truth values from first order logic elements so that a gradient-based machine learning model is able to consider any amount of conjunctions of features while learning and solving the issue as a whole. This reduces training data requirements overall for machine learning models as well as significantly reduces the amount of neural networks needing to be trained to solve a problem/task, which significantly reduces the overall amount of training time. For example, a neural network composed of several network structures feeding into each other can be trained together during a same training session. (See, for example, FIG. 5).

The modules of the neural-symbolic computing engine 100 are configured to interpret a set of encoded rules from the knowledge representations and reasoning. The neural-symbolic computing engine 100 also modifies the interpretation of the initial set of encoded rules by modifying vectors associated with different constants of the initial set of rules. The model representation module supports a gradient-based machine learning model that undergoes gradient-based learning that can i) adapt vectors associated with different constants with that set of rules that act as constraints and ii) adapt vectors of parameters of a network associated with different functions and predicates, in order to obtain a more optimum interpretation that makes the rules as true as possible. The truth values reflect the optimum interpretation that makes the rules as true as possible. Individual truth value's closer to '1.0' is considered more true and a value to closer to '0.0' are considered more false.

The neural-symbolic computing engine 100 can compile, for example, a neural network to this solve the issue. The theory representation module compiles, for example, a deep neural network from the knowledge, expressed in the first order logic and with domain-specific neural components. This example deep neural network can be trained using backpropagation, by fitting a model simultaneously to data and declarative knowledge. Here, the neural-symbolic computing engine 100 applies common-sense knowledge to the issue (e.g. problem, task, etc.), for example a visual relationship detection task.

The theory representation module can compile a neural network as a gradient-based machine learning model that undergoes gradient-based learning guided by the learner algorithm module.

The learner algorithm module may use the rules and side rules during training.

Again, the language module can place knowledge assertions as first order logic (e.g. fixed rules) guiding the network to be learned, constraining them to learn behavior consistent with background knowledge assertions. However, this neural-symbolic computing engine 100 also allows for side rules to be supplied that act as flexible gates to modify and/or alter the first order logic; as opposed to, merely a firm rule for some knowledge assertions to guide the network when learning with the training data. The learner algorithm module in the neural-symbolic computing engine 100 has a side-rules component configured to provide an architecture to act as a flexible gate within a framework of a gradient-based machine learning model using first order logic in which the knowledge representations are used as fixed rules "above" the neural networks during their learning, constraining them to learn behavior consistent with this background knowledge. (See FIG. 5) The rules alone work well for optimizing the performance of the component network evaluated standalone, but is unnecessarily restrictive in terms of building a hybrid learning and reasoning system; and thus, this system can also use a side-rules component.

In some situations, a learner algorithm module with the side-rules component modifies application of these fixed rules to influence learning in the first gradient-based machine learning model, improving performance by focusing on important tasks.

The set of rules act as constraints and are graphed into a network of a machine learning model that uses statistically-driven conclusions derived from training data to adapt the vectors. The side rules act as a flexible gate for these constraints. This interpretation of the encoded rules representing the knowledge representations and reasoning can be utilized in the machine learning model.

Figure 2:
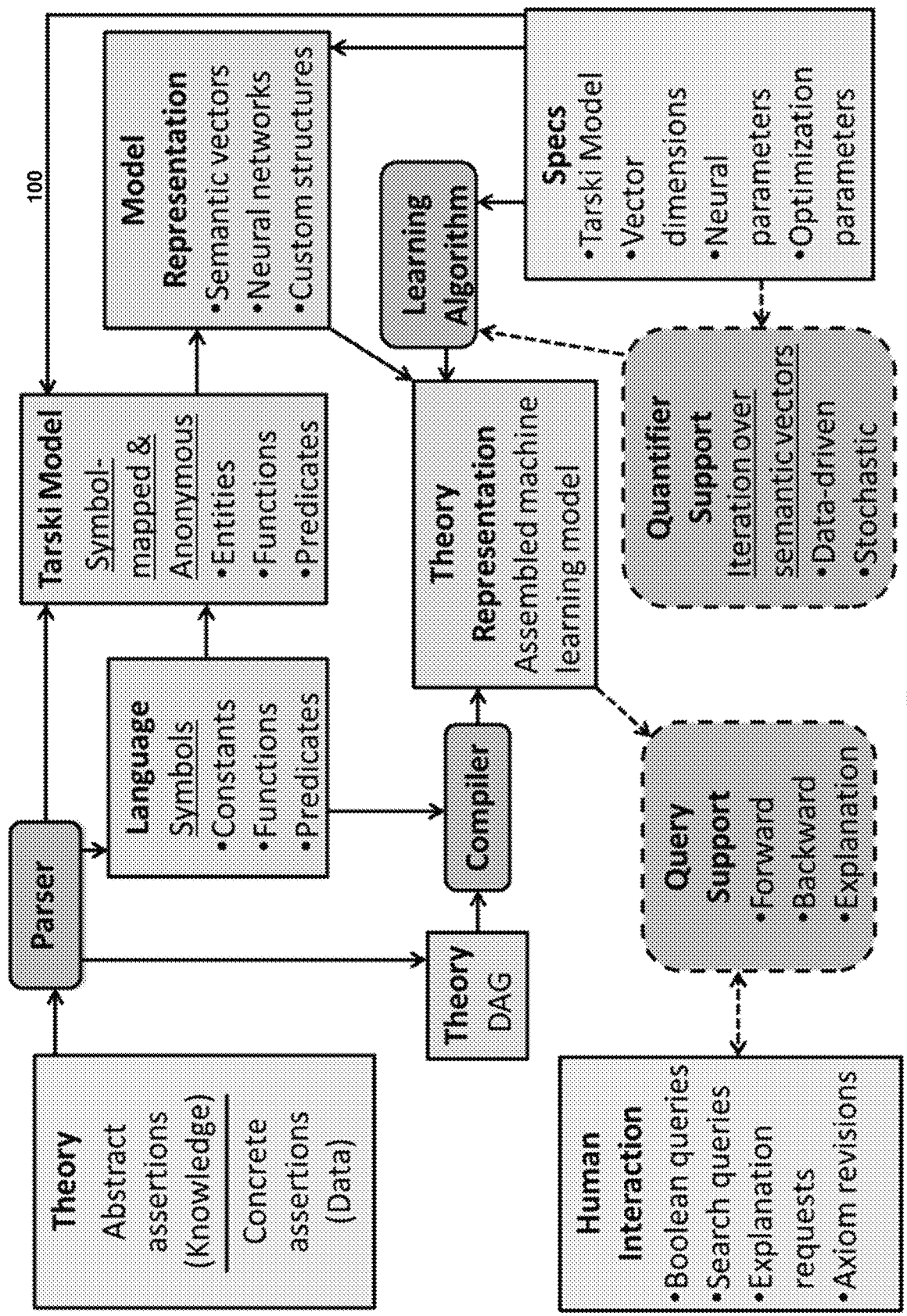
FIG. 2 illustrates an embodiment of an example neural-symbolic computing engine that has a query support module that allows the complied machine learning model to be queried to present how determinations are made by the neural network in the machine learning model to give explainability to query results.

FIG. 2 illustrates an embodiment of an example neural-symbolic computing engine that has a query support module that allows the complied machine learning model to be queried to present how determinations are made by the neural network in the machine learning model to give explainability to query results.

The example neural-symbolic computing engine 100 can contain the similar modules of a theory module, a language module, a model representation module, a theory representation module, a learner algorithm module, a query support module, etc.

Note, the example theory module can be configured to modify an initial set of encoded rules by i) allowing for semantically similar terms of art found in the data used for training the machine learning models to be logically associated by the modules, ii) allowing for a list of semantically similar terms supplied by a user to be logically associated by the modules of the neural-symbolic computing engine 100, and iii) any combination of these two to be used by the modules to logically associate semantically similar terms of art.

An example embodiment of a parser module is separate from the theory module but still configured to parse each statement to produce a parse stream into categories of constants, symbols, predicates and/or functions in that statement. The parser module is also configured to cooperate with a theory directed acrylic graph of nodes module (theory DAG) to go through each statement to turn each statement into its own tree structure of nodes and then layers of nodes for each predicate and/or function in that statement.

The theory representation module assembles and compile the gradient based machine learning model such as a neural network. The example types of neural networks compliable can include a Feedforward Neural Network, a Deep Neural Network, a Radial basis function Neural Network, a Kohonen Self Organizing Neural Network, a Recurrent Neural Network, a Convolutional Neural Network, etc., and combinations of these. Likewise, the neural-symbolic computing engine 100 can be implemented as any artificial intelligence-based differentiable logic engine and not a specific neural-symbolic computing engine implemented in one or more Neural Networks.

In an embodiment, additional details on how an example reasoning engine translates a user's description of a problem into layers making up the hierarchical architecture of the machine-based reasoning process can be found US patent publication No.: US 2020/0193286, published Jun. 18, 2020, Titled "DEEP ADAPTIVE SEMANTIC LOGIC NET- WORK, application Ser. No. 16/611,177, filed Nov. 5, 2019, which is incorporated herein by reference.

The theory representation module allows developers to incorporate domain knowledge into the design and training of a machine learning system. The system can learn better performance from less data as a result. A gradient-based machine learning model can learn to compute whether a given assertion is more true (represented by being closer '1') or false (represented by being closer '0'). A neural network created by the neural-symbolic computing engine 100 can be trained to make the asserted knowledge true, using values between '0' and '1' for intermediate levels of reasoning. In an embodiment, when the neural-symbolic computing engine 100 determines the issue being solved merely require a few factors then the neural-symbolic computing engine 100 can compile a neural network that does not use a logit transform. In a neural network created with small amount of levels of reasoning, the network can be trained as follows. In order to train the entire system, as discussed prior systems, truth values between '0' and '1' are mathematically multiplied to get the global truth value. For example, if we are 50% sure of fact A and 50% sure of fact B and 50% sure of fact C then how sure are we of all three facts? The answer 50% x 50% x 50%=12.5%. When these systems make assertions about data, then each statement must be true for each data point. As discussed before, the number of values multiplied grows with the size of the data. As discussed, the mathematical product of a large number of real numbers between '0' and '1', which are multiplied together, gets close to '0', and so does its derivative. When the derivative is close to '0' learning becomes subject to noise and will occur extremely slowly or not at all. So prior systems that use a technique merely multiply truth values to learn could not work with large data sets/amount of features to be considered by that neural network. However, as discussed in FIG. 1, the neural-symbolic computing engine 100 can employ logit transforms to create neural networks that solve larger issues.

For example, a deep network structure, for example, can be a decision tree with, for example, greater than five levels going from the bottom of the structure up to the top of the structure to solve an issue (e.g. task, problem) in a neural network.

Again, for these deep network structures, the model representation module can apply a logit transform (the logarithm of the odds of the probability) to the representation of truth-values from two or more conjunctions of features being considered in the gradient-based machine learning model to solve the task/problem/issue, which allows evaluation of gradient information at scale, making learning possible in the gradient-based machine learning model having multiple intermediate levels in the reasoning structure to arrive at its top level result. In an embodiment, a gradient in a neural network can be an error gradient indicating the direction and magnitude calculated during the training of a neural network that is used to update the network weights in the right direction and by the right amount.

Example Logit Transforms that can be Used

The logit transform can be mathematical operation applied in neural-symbolic computing to mitigate a vanishing gradient. A simple logit transform can be used. $\text{Logit}(x) = \log(x) - \log(1-x)$. Every real number is in the range of this transform. Products of truth values are transformed to sums of logits. Each term of a sum retains its derivative independent of how many more terms are added to it, so the limitation on data is removed.

More complex logit transforms can be applied to the feature conjunctions: For truth values t1 and t2 and corresponding logits l1 and l2, we define negation ($\neg$) and conjunction ($\wedge$) operators as:

$$\neg l1 = -l1$$

and $$l1 \wedge l2 = \text{logit}(t1 \cdot t2) = \log t1 + \log t2 - \log(1 - t1 \cdot t2)$$

Example Approximation of a Logit Transform

Special cases occasionally use a mathematical approximation above versus entire logit transform formula. The approximation of a Logit Transform may be:

$$l1 *^{t2} \sim -\ln(e^{-l1} + e^{-l2})$$

The approximation can be used when the product (t1·t2) of the features being considered is "1" or is close to "1".

The neural-symbolic computing engine 100 provides the framework for automating the generation of the gradient-based machine learning models including but not limited to neural networks that incorporate user-provided formal knowledge to improve learning from training data. The neural-symbolic computing engine 100 can use knowledge representations captured into first order logic and that use finite sampling from infinite domains, and converge to correct truth values. The neural-symbolic computing engine 100 improves on prior neural-symbolic work by adding a capacity to apply a logit transform to avoid vanishing gradients, allowing creation of a deeper logical structure to factor in more features when solving a task/issue/problem, and enabling richer interactions between the knowledge and learning components.

The neural-symbolic computing engine 100 adapts vector values associated with the constants as well as adapt parameters of the neural network with a goal to make assertions of the representations and reasoning to be true as possible, as well as to be consistent with the data used for training the machine learning model, which is indicated by a confidence score to convey the more optimum interpretation. A higher confidence score conveys that the reasoning is true as well as consistent with the data used for training the first machine learning model.

The neural-symbolic computing engine 100 improves on prior neural-symbolic work by adding a capacity to apply side rules.

In an embodiment, the neural-symbolic computing engine 100 cooperates the two or more modules with each other in order to create one or more gradient-based machine learning models that use an adaptive semantic learning for knowledge representations and reasoning.

FIG. 3 illustrates an embodiment of a block diagram of example constants and functions and predicates associated with network parameters to be encoded by a theory module and implemented in gradient-based machine learning model that undergoes gradient-based learning.

An example initial set of rules from the language module can be:

($\forall$x,y) (friends(x,y)$\rightarrow$friends(y,x))
($\forall$x,y)((smokes(x)$\wedge$friends(x,y))$\rightarrow$smokes(y))
($\forall$x)(smokes(x)$\rightarrow$hasCancer(x))

When the x and y vectors change in the rules, then the interpretation of those rules change.

In addition, each constant, such as Bob, Peter, Huey, or Loui, from the statements can have predicates and/or functions such as has cancer, smokes, are friends, etc. from the statements. The example predicates include has cancer, does smoke, are friends, etc.

The language module maps each person/constant such as Bob, Peter, Lori, etc. to a parameterized vector. The language module maps each predicate to a parameterized network/logical reasoning structure. The module representation module constructs the full network of each parameterized network from a formula parse tree. The example logical reasoning structure has four conjunctions of features. Since the neural networks are now compositional, the language module cooperates with the module representation module to construct independent networks for each function. The module representation module then assembles these into a single network based on the parse tree. This makes the neural-symbolic computing engine 100 compositional, where, for example, deep neural networks are assembled on the fly based on the theory supplied by the user.

Thus, the model representation module (e.g. a Tarski model), and/or the language module, can take in all of the constants in the statements and map them to a semantic vector as inputs to the sub graph of a neural network. The modules also take in all of the predicates in the supplied statements and map them to a sub graph of the neural networks, and then construct a full neural network from the parse tree of that statement.

The neural-symbolic computing engine 100 further works by avoiding vanishing gradients, allowing creation of a deeper architectural logical structure in the gradient-based machine learning model, which enables richer interactions between the knowledge and learning components. In the logical reasoning structure, data flows through the network from the bottom up, and outputs are generated out the top of the network. The neural-symbolic computing engine 100 also use backpropagation through the tree to minimize the loss to learn the model parameters.

FIG. 4 graphically illustrates a diagram of an embodiment of the concept of a deep adaptive semantic logic network being trained with both i) the knowledge assertions in the representations and reasoning provided from the expert knowledge through a theory module and ii) machine learning assertions derived from iterative training on data. Sets of statements create a set of rules to create the structure of the machine learning model and initially test the representations and reasons. Subsequently, the data being trained on, is used as feedback to revise the understanding of the language/terminology used in the set of rules in order to create a current interpretation of the set of rules. Thus, the first order logic creates fixed rules to guide learning in a first gradient-based machine learning model, and a side-rules component masks specified information in specified situations backpropagated with respect to the fixed rules to influence learning in the first gradient-based machine learning model.

FIG. 5 illustrates a block diagram of an embodiment of an example neural-symbolic computing engine that has a side-rules component configured to function as a flexible gate to mask specified information in specified situations with respect to the fixed rules to influence learning in a gradient-based machine learning model.

Referring to FIG. 5, as discussed, expert knowledge can be supplied to the neural symbolic computing engine. The expert knowledge representations can be, for example, 1. Persons→can ride a bike; 2. the bike→is in a ridable condition; 3. Person 'A'→can ride bike 'B' and thus is riding. As shown, the neural-symbolic computing engine 100 parses the above features and compiles a computational parse tree with two or more conjunctions of features being considered. The neural-symbolic computing engine 100 has its modules look over loss functions; data types—Boolean, real index; predicates and functions; as well as logical operators, including symbols. The side rules can be used as flexible gates to control the learning in this model.

In addition to learning from labeled training samples, the neural-symbolic computing engine 100 in this example incorporates knowledge representations from experts. The expressed knowledge representation 'CanRide' has a relationship to "riding." The commonsense knowledge representation conveys when the predicted relationship is "Riding" then— (1) the subject must be able to ride, (2) the object must be ridable, and (3) the subject must be above the object. Thus, the rule Riding(I) CanRide(s) can interact with a predictor by defining CanRide as a vector of truth values (e.g. 0; 0; 1; : : : ; 0; 1; 0i), which is True at the index of subjects which can ride. Incorporating such knowledge representations as rules results in a more robust model that uses high level semantics to improve generalization e.g. recognize novel examples in training data. Achieving this requires fusion of the continuous representations in neural networks with the discontinuous representations used to formalize expert knowledge. The framework of the neural-symbolic computing engine 100 achieves this by parsing expert knowledge (expressed in first order logic) into a parse tree of continuous functions. And then, backpropagation/feedback of results through the network structure (e.g. a parse tree) allows the machine learning model to jointly train model parameters to match data and expert knowledge. The side-rules component functions as the flexible gate to mask specified information in specified situations with respect to the fixed rules to influence learning. The machine learning is achievable in a neural network combining the three individual network structures of i) the relation classifier for predicates and functions, ii) the classifier for subjects, and iii) the object classifiers, joined through logical connectives in the knowledge representations and reasoning, which are composed into a single deep network with multiple intermediate levels from a bottom of the network structure to a top level of the network structure, which is trained to maximize a truthfulness measure of the knowledge representations and reasoning.

In the bike example, the example network that implements a simple rule set through composition of, for example, image classification network components created by the neural-symbolic computing engine 100.

The neural-symbolic computing engine 100 constructs a neural network to solves this riding issue. The issue, depicted in FIG. 5, of predicts the relationship between bounding boxes containing a subject and an object. In addition to learning from labeled training samples, the neural network incorporates the commonsense knowledge that if the predicted relationship is "Riding" then the subject must be able to ride, and the object (e.g. bike) must be ridable, and the subject must be above the object. Incorporating such knowledge representations results in a more robust model that uses high-level semantics to improve generalization and learn from a small number of examples. The neural-symbolic computing engine 100 achieves integration of the continuous representations in this neural network with the discrete representations typically used for knowledge representation by compiling the neural network from the knowledge assertions and grounding the vocabulary of the domain in component networks, enabling gradient-based learning of the model parameters.

The neural-symbolic computing engine 100 treats labels like assertions about data, removing any distinction between knowledge and data. This provides a mechanism by which supervised, semi-supervised, unsupervised, and distantly supervised learning can take place simultaneously in a single network under a single training regime.

The Side-Rules Component

A language module cooperating with the learning algorithm module can cause a generation of a side-rules component within the generated gradient based machine learning model that restricts the information that backpropagates to the component networks in which the supplied knowledge representations are used as a rigid filter to remove and/or correct possibilities that are not logically possible based on the knowledge representations from consideration in the generated machine learning model in order to relax restrictions on the generated machine learning model; rather than enforce additional restrictions, improving performance by focusing on important sub-problems.

A language module can support declarative knowledge of, for example, "besides" from the theory module to create a side rule to operate as a flexible gate, allowing information to flow in certain situations and blocking that flow in other situations. Again, the neural-symbolic computing engine 100 uses first order logic to create fixed rules to guide learning in a gradient-based machine learning model, such as a neural network's learning. The side-rules component functions as a flexible gate to mask specified information in specified situations with respect to the fixed rules to influence learning in the gradient-based machine learning model. The side-rules component provides syntactic extensions that allow restricted quantification over predicates and functions without violating the first order logic constraints. The side knowledge that masks out merely certain situations will improve the overall learning performance of the system. The side rules can filter out some possibilities in a first set of situations and/or correct possibilities in a second set of situations for the same set of features being analyzed. Thus, the side-rules component operates as a gate, allowing information to flow in certain situations and blocking that flow of information in other situations. This can be used to give the neural network more freedom to learn currently unknown relationships and information, rather than just restricting what the network can learn. The neural network has more freedom because its output will be ignored in some situations, so it no longer needs to address those situations. This leaves it free to allocate its limited resources to best learn the most important aspects of the task. The side-rules component acting as a flexible gate in sets of situations modifies an existing firm rule to enable richer interaction between the knowledge known in a domain, information supplied by a user, and learning components. The side-rules component can allow a user and/or the domain specific database to add, for example, a first situation of commonsense knowledge to modify fixed rules and/or to ignore the output of the neural network in order to improve performance (accuracy) of the learning. The network has more freedom because its output will be ignored in some situations, so it no longer needs to address those situations. This leaves the network free to allocate its limited resources to best learn the most important aspects of the task.

Network Structure with Multiple Intermediate Levels

The network structure in FIG. 5 has multiple intermediate levels from a bottom of the network structure to a top level of the network structure. The neural network combines the three individual network structures of i) the relation classifier for predicates and functions, ii) the classifier for subjects, and iii) the object classifiers, (each being composed of several levels) that are then joined through logical connectives in the knowledge representations and reasoning, which are composed into a single deep network with multiple intermediate levels until top level result of whether a particular person is/can ride a particular bike. The neural-symbolic computing engine 100 uses a logit technique to scale to apply to larger data sets and train to better solutions (less error in training). The impact can be measured directly by training a given neural network on a given training data set first under the original 0-1 representation and secondly under the logit representation, and comparing the results. The result will increase performance (accuracy) on machine learning tasks. Using a logit transformation and the side rules as a flexible gate on learning has benefits of faster learning, more accurate learning, and an ability to work with larger data sets.

Network

FIG. 6 illustrates a diagram of a number of electronic systems and devices communicating with each other in a network environment in accordance with an embodiment of the neural-symbolic computing engine. The network environment 800 has a communications network 820. The network 820 can include one or more networks selected from an optical network, a cellular network, the Internet, a Local Area Network ("LAN"), a Wide Area Network ("WAN"), a satellite network, a fiber network, a cable network, and combinations thereof. In an embodiment, the communications network 820 is the Internet. As shown, there may be many server computing systems and many client computing systems connected to each other via the communications network 820. However, it should be appreciated that, for example, a single client computing system can also be connected to a single server computing system. Thus, any combination of server computing systems and client computing systems may connect to each other via the communications network 820.

The neural-symbolic computing engine can use a network like this to supply training data to create and train a neural network. The neural-symbolic computing engine can also reside and be implemented in this network environment, for example, in the cloud platform of server 804A and database 806A, a local server 804B and database 806B, on a device such as laptop 802D, in a smart system such as smart automobile 802D, and other similar platforms.

The communications network 820 can connect one or more server computing systems selected from at least a first server computing system 804A and a second server computing system 804B to each other and to at least one or more client computing systems as well. The server computing system 804A can be, for example, the one or more server systems 220. The server computing systems 804A and 804B can each optionally include organized data structures such as databases 806A and 806B. Each of the one or more server computing systems can have one or more virtual server computing systems, and multiple virtual server computing systems can be implemented by design. Each of the one or more server computing systems can have one or more firewalls to protect data integrity.

The at least one or more client computing systems can be selected from a first mobile computing device 802A (e.g., smartphone with an Android-based operating system), a second mobile computing device 802E (e.g., smartphone with an iOS-based operating system), a first wearable electronic device 802C (e.g., a smartwatch), a first portable computer 802B (e.g., laptop computer), a third mobile computing device or second portable computer 802F (e.g., tablet with an Android- or iOS-based operating system), a smart device or system incorporated into a first smart automobile 802D, a smart device or system incorporated into a first smart bicycle, a first smart television 802H, a first virtual reality or augmented reality headset 804C, and the like. The client computing system 802B can be, for example, one of the one or more client systems 210, and any one or more of the other client computing systems (e.g., 802A, 802C, 802D, 802E, 802F, 802G, 802H, and/or 804C) can include, for example, the software application or the hardware-based system in which the training of the artificial intelligence can occur and/or can be deployed into. Each of the one or more client computing systems can have one or more firewalls to protect data integrity.

It should be appreciated that the use of the terms "client computing system" and "server computing system" is intended to indicate the system that generally initiates a communication and the system that generally responds to the communication. For example, a client computing system can generally initiate a communication and a server computing system generally responds to the communication. No hierarchy is implied unless explicitly stated. Both functions can be in a single communicating system or device, in which case, the client-server and system-client relationship can be viewed as peer-to-peer. Thus, if the first portable computer 802B (e.g., the client computing system) and the server computing system 804A can both initiate and respond to communications, their communications can be viewed as peer-to-peer. Additionally, the server computing systems 804A and 804B include circuitry and software enabling communication with each other across the network 820. Server 804B may send, for example, simulator data to server 804A.

Any one or more of the server computing systems can be a cloud provider. A cloud provider can install and operate application software in a cloud (e.g., the network 820 such as the Internet) and cloud users can access the application software from one or more of the client computing systems. Generally, cloud users that have a cloud-based site in the cloud cannot solely manage a cloud infrastructure or platform where the application software runs. Thus, the server computing systems and organized data structures thereof can be shared resources, where each cloud user is given a certain amount of dedicated use of the shared resources. Each cloud user's cloud-based site can be given a virtual amount of dedicated space and bandwidth in the cloud. Cloud applications can be different from other applications in their scalability, which can be achieved by cloning tasks onto multiple virtual machines at run-time to meet changing work demand. Load balancers distribute the work over the set of virtual machines. This process is transparent to the cloud user, who sees only a single access point.

Cloud-based remote access can be coded to utilize a protocol, such as Hypertext Transfer Protocol ("HTTP"), to engage in a request and response cycle with an application on a client computing system such as a web-browser application resident on the client computing system. The cloud-based remote access can be accessed by a smartphone, a desktop computer, a tablet, or any other client computing systems, anytime and/or anywhere. The cloud-based remote access is coded to engage in 1) the request and response cycle from all web browser-based applications, 3) the request and response cycle from a dedicated on-line server, 4) the request and response cycle directly between a native application resident on a client device and the cloud-based remote access to another client computing system, and 5) combinations of these.

In an embodiment, the server computing system 804A can include a server engine, a web page management component or direct application component, a content management component, and a database management component. The server engine can perform basic processing and operating-system level tasks. The web page management component can handle creation and display or routing of web pages or screens associated with receiving and providing digital content and digital advertisements, through a browser. Likewise, the direct application component may work with a client app resident on a user's device. Users (e.g., cloud users) can access one or more of the server computing systems by means of a Uniform Resource Locator ("URL") associated therewith. The content management component can handle most of the functions in the embodiments described herein. The database management component can include storage and retrieval tasks with respect to the database, queries to the database, and storage of data.

In an embodiment, a server computing system can be configured to display information in a window, a web page, or the like. An application including any program modules, applications, services, processes, and other similar software executable when executed on, for example, the server computing system 804A, can cause the server computing system 804A to display windows and user interface screens in a portion of a display screen space.

Each application has a code scripted to perform the functions that the software component is coded to carry out such as presenting fields to take details of desired information. Algorithms, routines, and engines within, for example, the server computing system 804A can take the information from the presenting fields and put that information into an appropriate storage medium such as a database (e.g., database 806A). A comparison wizard can be scripted to refer to a database and make use of such data. The applications may be hosted on, for example, the server computing system 804A and served to the specific application or browser of, for example, the client computing system 802B. The applications then serve windows or pages that allow entry of details.

Computing Systems

FIG. 7 illustrates a diagram of an embodiment of one or more computing devices that can be a part of the systems associated with the neural-symbolic computing engine discussed herein. The computing device 900 may include one or more processors or processing units 920 to execute instructions, one or more memories 930-932 to store information, one or more data input components 960-963 to receive data input from a user of the computing device 900, one or more modules that include the management module, a network interface communication circuit 970 to establish a communication link to communicate with other computing devices external to the computing device, one or more sensors where an output from the sensors is used for sensing a specific triggering condition and then correspondingly generating one or more preprogrammed actions, a display screen 991 to display at least some of the information stored in the one or more memories 930-932 and other components. Note, portions of this system that are implemented in software 944, 945, 946 may be stored in the one or more memories 930-932 and are executed by the one or more processors 920.

The system memory 930 includes computer storage media in the form of volatile and/or nonvolatile memory such as read-only memory (ROM) 931 and random access memory (RAM) 932. These computing machine-readable media can be any available media that can be accessed by computing system 900. By way of example, and not limitation, computing machine-readable media use includes storage of information, such as computer-readable instructions, data structures, other executable software, or other data. Computer-storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible medium which can be used to store the desired information and which can be accessed by the computing device 900. Transitory media such as wireless channels are not included in the machine-readable media. Communication media typically embody computer readable instructions, data structures, other executable software, or other transport mechanism and includes any information delivery media.

The system further includes a basic input/output system 933 (BIOS) containing the basic routines that help to transfer information between elements within the computing system 900, such as during start-up, is typically stored in ROM 931. RAM 932 typically contains data and/or software that are immediately accessible to and/or presently being operated on by the processing unit 920. By way of example, and not limitation, the RAM 932 can include a portion of the operating system 934, application programs 935, other executable software 936, and program data 937.

The computing system 900 can also include other removable/non-removable volatile/nonvolatile computer storage media. By way of example only, the system has a solid-state memory 941. The solid-state memory 941 is typically connected to the system bus 921 through a non-removable memory interface such as interface 940, and USB drive 951 is typically connected to the system bus 921 by a removable memory interface, such as interface 950.

A user may enter commands and information into the computing system 900 through input devices such as a keyboard, touchscreen, or software or hardware input buttons 962, a microphone 963, a pointing device and/or scrolling input component, such as a mouse, trackball or touch pad. These and other input devices are often connected to the processing unit 920 through a user input interface 960 that is coupled to the system bus 921, but can be connected by other interface and bus structures, such as a parallel port, game port, or a universal serial bus (USB). A display monitor 991 or other type of display screen device is also connected to the system bus 921 via an interface, such as a display interface 990. In addition to the monitor 991, computing devices may also include other peripheral output devices such as speakers 997, a vibrator 999, and other output devices, which may be connected through an output peripheral interface 995.

The computing system 900 can operate in a networked environment using logical connections to one or more remote computers/client devices, such as a remote computing system 980. The remote computing system 980 can a personal computer, a mobile computing device, a server, a router, a network PC, a peer device or other common network node, and typically includes many or all of the elements described above relative to the computing system 900. The logical connections can include a personal area network (PAN) 972 (e.g., Bluetooth®), a local area network (LAN) 971 (e.g., Wi-Fi), and a wide area network (WAN) 973 (e.g., cellular network), but may also include other networks such as a personal area network (e.g., Bluetooth®). Such networking environments are commonplace in offices, enterprise-wide computer networks, intranets and the Internet. A browser application may be resonant on the computing device and stored in the memory.

When used in a LAN networking environment, the computing system 900 is connected to the LAN 971 through a network interface 970, which can be, for example, a Bluetooth® or Wi-Fi adapter. When used in a WAN networking environment (e.g., Internet), the computing system 900 typically includes some means for establishing communications over the WAN 973. With respect to mobile telecommunication technologies, for example, a radio interface, which can be internal or external, can be connected to the system bus 921 via the network interface 970, or other appropriate mechanism. In a networked environment, other software depicted relative to the computing system 900, or portions thereof, may be stored in the remote memory storage device. By way of example, and not limitation, the system has remote application programs 985 as residing on remote computing device 980. It will be appreciated that the network connections shown are examples and other means of establishing a communications link between the computing devices that may be used.

As discussed, the computing system 900 can include mobile devices with a processing unit 920, a memory (e.g., ROM 931, RAM 932, etc.), a built-in battery to power the computing device, an AC power input to charge the battery, a display screen, a built-in Wi-Fi circuitry to wirelessly communicate with a remote computing device connected to network.

It should be noted that the present design can be carried out on a computing system such as that described with respect to shown herein. However, the present design can be carried out on a server, a computing device devoted to message handling, or on a distributed system in which different portions of the present design are carried out on different parts of the distributed computing system.

In some embodiments, software used to facilitate algorithms discussed herein can be embedded onto a non-transitory machine-readable medium. A machine-readable medium includes any mechanism that stores information in a form readable by a machine (e.g., a computer). For example, a non-transitory machine-readable medium can include read-only memory (ROM); random access memory (RAM); magnetic disk storage media; optical storage media; flash memory devices; Digital Versatile Disc (DVD's), EPROMs, EEPROMs, FLASH memory, magnetic or optical cards, or any type of media suitable for storing electronic instructions.

Note, an application described herein includes but is not limited to software applications, mobile applications, and programs that are part of an operating system application. Some portions of this description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms can be written in a number of different software programming languages such as C, C++, HTTP, Java, Python, or other similar languages. Also, an algorithm can be implemented with lines of code in software, configured logic gates in software, or a combination of both. In an embodiment, the logic consists of electronic circuits that follow the rules of Boolean Logic, software that contain patterns of instructions, or any combination of both. Any portions of an algorithm implemented in software can be stored in an executable format in portion of a memory and is executed by one or more processors.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

Many functions performed by electronic hardware components can be duplicated by software emulation. Thus, a software program written to accomplish those same functions can emulate the functionality of the hardware components in input-output circuitry. Thus, provided herein are one or more non-transitory machine-readable medium configured to store instructions and data that when executed by one or more processors on the computing device of the foregoing system, causes the computing device to perform the operations outlined as described herein.

References in the specification to "an embodiment," "an example", etc., indicate that the embodiment or example described may include a particular feature, structure, or characteristic, but every embodiment may not necessarily include the particular feature, structure, or characteristic. Such phrases can be not necessarily referring to the same embodiment. Further, when a particular feature, structure, or characteristic is described in connection with an embodiment, it is believed to be within the knowledge of one skilled in the art to affect such feature, structure, or characteristic in connection with other embodiments whether or not explicitly indicated.

While the foregoing design and embodiments thereof have been provided in considerable detail, it is not the intention of the applicant(s) for the design and embodiments provided herein to be limiting. Additional adaptations and/or modifications are possible, and, in broader aspects, these adaptations and/or modifications are also encompassed. Accordingly, departures may be made from the foregoing design and embodiments without departing from the scope afforded by the following claims, which scope is only limited by the claims when appropriately construed.

What is claimed is:

1. An apparatus, comprising:
a neural-symbolic computing engine that has two or more modules that are configured to cooperate with each other in order to create one or more gradient-based machine learning models that use machine learning on i) knowledge representations and ii) reasoning, to solve an issue, where a model representation module in the neural-symbolic computing engine is configured to apply one or more mathematical functions, at least including a logit transform, to truth values from first order logic elements supplied from a language module of the neural-symbolic computing engine.

2. The apparatus of claim 1, where the two or more modules further cooperate to cause an encoding of the knowledge representations and the reasoning into a first gradient-based machine learning model from information supplied by a person to a theory module of the neural-symbolic computing engine.

3. The apparatus of claim 1, where a theory representation module in the neural-symbolic computing engine is configured to compile a neural network as a first gradient-based machine learning model that undergoes gradient-based learning.

4. The apparatus of claim 3, where the first gradient-based machine learning model that undergoes gradient-based learning is configured to i) adapt vectors associated with different constants of a set of rules that act as constraints and ii) adapt vectors of parameters of a network associated with different functions and predicates, in order to obtain an interpretation that makes the rules as true as possible.

5. The apparatus of claim 1, where the model representation module is further configured to create a first gradient-based machine learning model that uses the logit transform of the truth values to avoid vanishing gradients that would have resulted from multiplying truth values of a network in the first gradient-based machine learning model.

6. The apparatus of claim 5, where the truth values come from a network structure in the network having multiple intermediate levels from a bottom of the network structure to a top level of the network structure.

7. The apparatus of claim 1, where the one or more gradient-based machine learning models that use machine learning are one or more neural networks, where the neural-symbolic computing engine is configured to represent the knowledge representations and reasoning in the first order logic, where relations and functions that make up a vocabulary of the knowledge representations and reasoning are then implemented in the one or more neural networks that can have an arbitrary network structure, where logical connectives in the knowledge representations and reasoning are composed into a single deep network with multiple intermediate levels from a bottom of the network structure to a top level of the network structure, which is trained to maximize a truthfulness measure of the knowledge representations and reasoning.

8. The apparatus of claim 1, where a learner algorithm module in the neural-symbolic computing engine has a side-rules component configured to provide an architecture to act as a flexible gate within a framework of a first gradient-based machine learning model using the first order logic in which the knowledge representations are used as fixed rules, and in some situations, the side-rules component modifies application of these fixed rules to influence learning in the first gradient-based machine learning model.

9. The apparatus of claim 1, where the model representation module in the neural-symbolic computing engine is further configured to apply the logit transform to truth values from the first order logic elements so that a first gradient-based machine learning model is able to consider any amount of conjunctions of features while learning and solving the issue as a whole; rather than having to break down parts of that issue being solved into smaller sub problems.

10. A non-transitory computer-readable medium including executable instructions that, when executed with one or more processors, cause a neural-symbolic computing system to perform operations as follows, comprising:

creating one or more gradient-based machine learning models that use machine learning on i) knowledge representations and ii) reasoning to solve an issue; and applying one or more mathematical functions, at least including a logit transform, to truth values from first order logic elements.

11. A method for neural-symbolic computing, comprising:
configuring a neural-symbolic computing engine to create one or more gradient-based machine learning models that use machine learning on i) knowledge representations and ii) reasoning to solve an issue, where the neural-symbolic computing engine applies one or more mathematical functions, at least including a logit transform, to truth values from first order logic elements.

12. The method of claim 11, further comprising:
causing an encoding of the knowledge representations and the reasoning into a first gradient-based machine learning model from information supplied by a person to the neural-symbolic computing engine.

13. The method of claim 11, where the neural-symbolic computing engine is configured to compile a neural network as a first gradient-based machine learning model that undergoes gradient-based learning.

14. The method of claim 13, further comprising:
configuring the first gradient-based machine learning model that undergoes gradient-based learning to i) adapt vectors associated with different constants of a set of rules that act as constraints and ii) adapt vectors of parameters of a network associated with different functions and predicates, in order to obtain an interpretation that makes the rules as true as possible.

15. The method of claim 11, further comprising:
creating a first gradient-based machine learning model that uses the logit transform of the truth values to avoid vanishing gradients that would have resulted from multiplying truth values of a network in the first gradient-based machine learning model.

16. The method of claim 15, where the truth values come from a network structure in the network having multiple intermediate levels from a bottom of the network structure to a top level of the network structure.

17. The method of claim 11, where the one or more gradient-based machine learning models that use machine learning are one or more neural networks, where the neural-symbolic computing engine is configured to represent the knowledge representations and reasoning in the first order logic, where relations and functions that make up a vocabulary of the knowledge representations and reasoning are then implemented in the one or more neural networks that can have an arbitrary network structure, where logical connectives in the knowledge representations and reasoning are composed into a single deep network with multiple intermediate levels from a bottom of the network structure to a top level of the network structure, which is trained to maximize a truthfulness measure of the knowledge representations and reasoning.

18. The method of claim 11, further comprising:
configuring side-rules to provide an architecture to act as a flexible gate within a framework of a first gradient-based machine learning model using the first order logic in which the knowledge representations are used as fixed rules, and in some situations, the side-rules modify application of these fixed rules to influence learning in the first gradient-based machine learning model.

19. The method of claim 11, further comprising:
configuring the neural-symbolic computing engine to use the first order logic to create fixed rules to guide learning in a first gradient-based machine learning model, and configuring side-rules to mask specified information in specified situations with respect to the fixed rules to influence learning in the first gradient-based machine learning model.

20. The method of claim 11, further comprising:
configuring the neural-symbolic computing engine to apply the logit transform to truth values from the first order logic elements so that a first gradient-based machine learning model is able to consider any amount of conjunctions of features while learning and solving the issue as a whole; rather than having to break down parts of that issue being solved into smaller sub problems each with its own sub set of conjunctions of features and having to learn and train solve each one of those sub problems individually and then subsequently having to train to use the sub problems' combined outputs to solve the issue as the whole.

* * * * *